United States Patent
Testu et al.

(10) Patent No.: US 8,146,297 B2
(45) Date of Patent: Apr. 3, 2012

(54) RAPID LOCKING AND UNLOCKING DEVICE FOR AN ATTACHMENT PLATE FOR A SWIMMING POOL SHELTER ROOF ELEMENT

(75) Inventors: William Testu, Aurade (FR); Philippe Lenoir, Cornebarrieu (FR)

(73) Assignee: ABRISUD, Lille Jourdain (FR)

( * ) Notice: Subject to any disclaimer, the term of this patent is extended or adjusted under 35 U.S.C. 154(b) by 127 days.

(21) Appl. No.: 12/601,470

(22) PCT Filed: May 30, 2008

(86) PCT No.: PCT/FR2008/050954
§ 371 (c)(1),
(2), (4) Date: Jan. 20, 2010

(87) PCT Pub. No.: WO2008/149042
PCT Pub. Date: Dec. 11, 2008

(65) Prior Publication Data
US 2010/0139205 A1     Jun. 10, 2010

(30) Foreign Application Priority Data
May 30, 2007 (FR) ..................................... 07 55350

(51) Int. Cl.
*F16B 13/06* (2006.01)
*E04H 4/10* (2006.01)
*E04H 15/62* (2006.01)

(52) U.S. Cl. .... 52/4; 52/704; 4/503; 411/34; 405/259.3; 405/259.4

(58) Field of Classification Search ................ 52/4, 155, 52/160, 704; 4/503; 296/100.16; 411/34; 24/458; 114/203; 215/359; 405/259.3, 259.4
See application file for complete search history.

(56) References Cited

U.S. PATENT DOCUMENTS
14,630 A * 4/1856 Abbott .......................... 239/654
(Continued)

FOREIGN PATENT DOCUMENTS
EP    1 367 266 A    12/2003
(Continued)

OTHER PUBLICATIONS
International Search Report, Nov. 18, 2008, from International Phase of the instant application.
(Continued)

*Primary Examiner* — Robert Canfield
(74) *Attorney, Agent, or Firm* — Jackson Patent Law Office

(57) ABSTRACT

The invention relates to a device (D) for locking/unlocking to the ground (S) of a connecting plate (100) to the ground or to the rim of a basin of a roof element, the plate (100) being on the one hand connected to the rim of the roof element and on the other hand connected to the ground (S) or to the basin rim, the plate (100) being pierced with an orifice (121) coming opposite a hole (200) made in the ground, the locking/unlocking device interacting with the hole (200) made in the ground and resting on the plate (100) for the purpose of attaching the latter. This device is noteworthy in that it comprises an expandable bush (300) changing from a volume called a rest volume allowing it to be inserted into the hole (200) made in the ground to a volume called the expanded volume ensuring its adhesion to the walls (210) of the said hole (200). Applications: attaching swimming pool shelters.

7 Claims, 6 Drawing Sheets

U.S. PATENT DOCUMENTS

| | | | | |
|---|---|---|---|---|
| 932,948 | A * | 8/1909 | Bacter | 215/359 |
| 1,855,329 | A * | 4/1932 | Wagner | 411/72 |
| 2,315,538 | A * | 4/1943 | Moeller | 215/359 |
| 2,321,515 | A * | 6/1943 | Rice | 114/227 |
| 2,822,108 | A * | 2/1958 | Moeller | 220/238 |
| 2,842,999 | A * | 7/1958 | Huston | 411/16 |
| 2,952,024 | A * | 9/1960 | Bartolucci | 4/503 |
| 2,958,872 | A * | 11/1960 | Meyer, Jr. | 4/503 |
| 3,148,384 | A * | 9/1964 | Bartolucci et al. | 4/503 |
| 3,192,820 | A * | 7/1965 | Pitzer | 411/33 |
| 3,229,309 | A * | 1/1966 | Knodel | 4/503 |
| 3,279,301 | A * | 10/1966 | Fischer | 29/522.1 |
| 3,295,712 | A * | 1/1967 | Peterson | 220/235 |
| 3,354,472 | A * | 11/1967 | Steinbeck | 4/503 |
| 3,709,088 | A * | 1/1973 | Pitzer | 411/70 |
| 3,836,035 | A * | 9/1974 | Simbirdi | 220/235 |
| 4,437,795 | A * | 3/1984 | White | 405/259.3 |
| 4,656,806 | A * | 4/1987 | Leibhard et al. | 52/704 |
| 4,692,076 | A * | 9/1987 | Herb | 411/55 |
| 4,747,737 | A * | 5/1988 | Roffelsen | 411/34 |
| 4,861,197 | A * | 8/1989 | Calandra, Jr. | 405/259.3 |
| 4,930,657 | A * | 6/1990 | Walker | 220/235 |
| 4,953,269 | A | 9/1990 | Ragsdale | |
| 4,984,946 | A * | 1/1991 | Phillips, II | 411/34 |
| 5,184,377 | A | 2/1993 | Ragsdale et al. | |
| 5,259,714 | A * | 11/1993 | Campbell | 411/34 |
| 5,519,923 | A * | 5/1996 | Rojdev et al. | 27/1 |
| 5,531,551 | A * | 7/1996 | Bowers | 411/70 |
| 5,590,921 | A * | 1/1997 | Holtman et al. | 292/257 |
| 5,671,576 | A * | 9/1997 | Kluser | 52/512 |
| 5,853,841 | A * | 12/1998 | Castor et al. | 428/99 |
| 5,931,516 | A * | 8/1999 | Holtman et al. | 292/257 |
| 6,202,265 | B1 * | 3/2001 | Caine | 24/453 |
| 6,419,104 | B1 * | 7/2002 | Sarajian | 220/234 |
| 6,868,590 | B2 * | 3/2005 | Bentrim | 24/458 |
| 2009/0249538 | A1 * | 10/2009 | Pesta | 4/503 |
| 2010/0086376 | A1 * | 4/2010 | McClure | 411/71 |

FOREIGN PATENT DOCUMENTS

| | | |
|---|---|---|
| FR | 2 829 196 A | 3/2003 |
| JP | 5-187418 * | 7/1993 |

OTHER PUBLICATIONS

English Translation of International Preliminary Report on Patentability Chapter II, Mar. 19, 2010, from International Phase of the instant application.

* cited by examiner

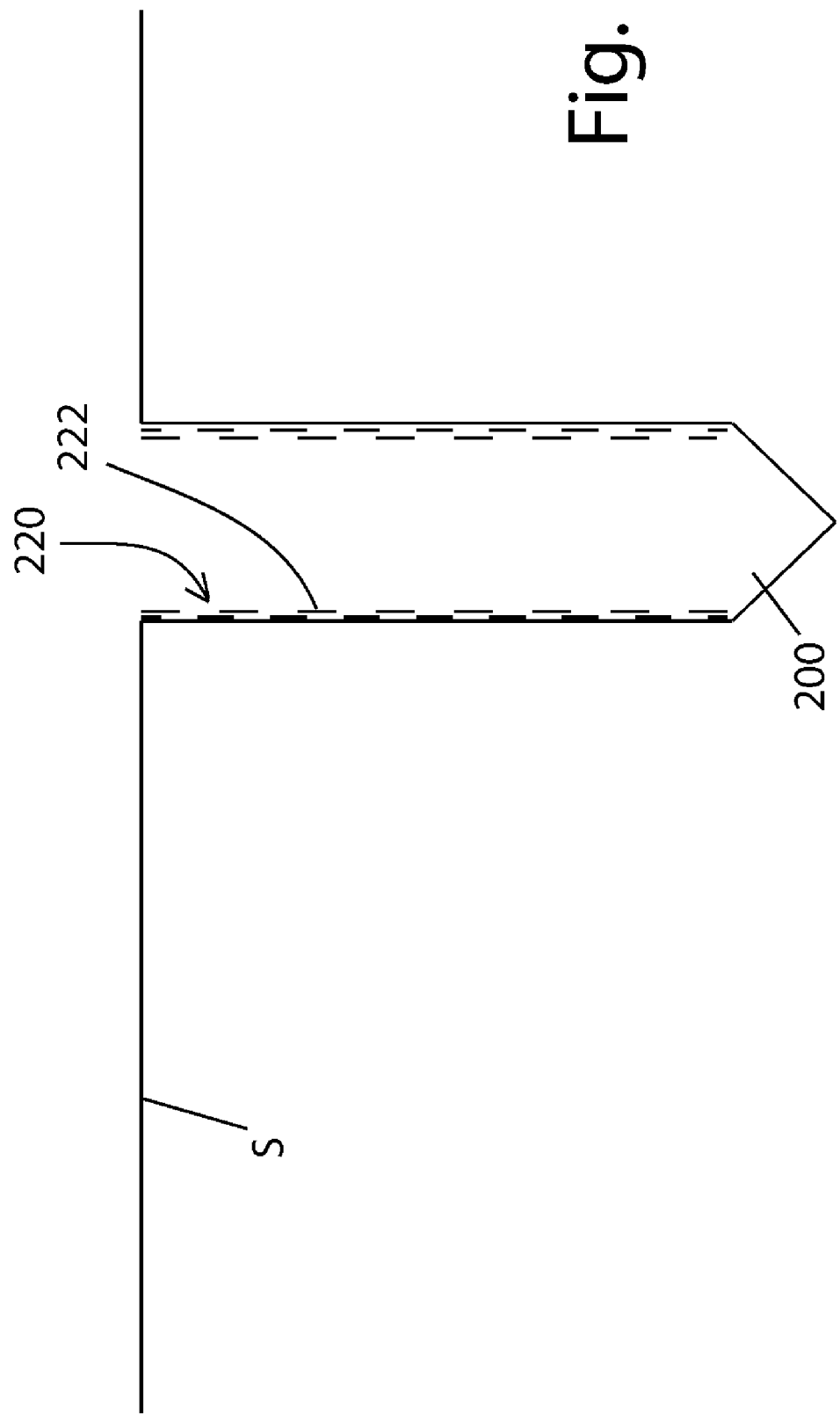

RAPID LOCKING AND UNLOCKING DEVICE FOR AN ATTACHMENT PLATE FOR A SWIMMING POOL SHELTER ROOF ELEMENT

FIELD OF APPLICATION OF THE INVENTION

This invention relates to the field of swimming pool shelters and in particular to the adaptations making it possible to carry out the attaching to the ground of the roof elements constituting said shelters in the best conditions.

DESCRIPTION OF PRIOR ART

Swimming pool shelters are conventionally connected to the ground or to the rim of the basin by means of connecting plates which, pierced with an orifice, are subjected to the ground or to the rim of the basin by means of a threaded rod provided with a head associated with a handle. Said rod crosses the plate and comes to screw into a threaded insert inserted into the ground for this purpose, until the head comes to rest on the plate and maintains it in position. Conventionally, the operations of removing or of installing shelters requires the unscrewing or the screwing of at least four threaded rods per roof element.

In certain embodiments, in addition to their function of attaching to the ground rims of the roof element, the connecting plates allow for the swinging of the roof elements on one of their rims in order to allow for the opening of the shelter by maintaining of the half-opened position. These connecting plates are therefore solicited by non-negligible constraints that require a secured connection to the ground.

DESCRIPTION OF THE INVENTION

The duration of the screwing and unscrewing operations has led the applicant to carry out research aiming to propose a device for attaching connecting plates to the ground of swimming pool shelters proposing a faster locking/unlocking for the connecting plates.

Another objective of this research was to design a device able to adapt to existing installations and in particular to the threaded inserts (or pins) that are already inserted into the ground for the purposes of receiving threaded rods that are conventionally used for attaching the plates to the ground or to the rim of the basin.

This research resulted in the conception of a device for locking and unlocking resolving the problems of prior art and able to be incorporated into the existing installations.

According to the invention, this device for locking and unlocking to the ground of a connecting plate to the ground or to the rim of a basin of a roof element, the plate being on the one hand connected to the rim of the roof element and on the other hand connected to the ground or to the rim of the basin, the plate being pierced by an orifice which comes to face a hole made in the ground, the device interacting with the hole made in the ground and resting on the plate for the purposes of attaching the latter, is remarkable in that it comprises an expandable bushing passing from a volume called a rest volume authorising its introduction into the hole made in the ground to a volume called the expanded volume providing its adhesion to the walls of said hole.

This characteristic is particularly advantageous in that it no longer requires an operation of screwing for the attaching of the plates to the ground or to the rim of the pool. Furthermore, the introduction of the bushing is particularly rapid since its size at rest is smaller than the size of the hole made in the ground.

Likewise, from the judicious choice of materials and dimensions for the bushing, it is entirely possible for the expansion of the bushing for example made of plastic to provide for the adhesion of the latter to the walls, even threaded, of the hole made in the ground. As such, the device of the invention can perform its function in the existing installations that comply with the objectives that are set. To do this, the expandable bushing is a cylinder made of elastic material of which a pressure on its ends allows for the creation of a radial expansion of its body which is going to make possible the adhesion of the bushing to the walls of the hole.

According to another technological choice that is particularly adapted to the presence of a threaded insert provided for the hole made in the ground, the expandable bushing is comprised of a threaded cylinder according to the pitch and the depth defined by the insert and split in order to pass from a rest position of a diameter allowing for the sliding of the bushing in the threaded insert to an expanded position wherein the diameter corresponds to a threaded rod interacting with the threading of the insert. This characteristic optimises the resistance to traction of the attaching. Nevertheless, as proposed hereinabove, a bushing made of plastic material can also extend radially inside a threaded insert and offer, through the flexibility of the plastic material interacting with the threading, very good resistance. Likewise, according to another embodiment, the insert can be made of plastic material and the expandable bushing can have a threaded or grooved exterior surface.

According to another particularly advantageous characteristic, the expandable bushing is hollow and is threaded onto a rod provided with a head interacting with the lower end of the expandable bushing and of which the displacement in translation provides for the expansion or the decrease of the bushing.

According to another particularly advantageous characteristic, said bushing is associated with a means of locking and support on the plate which controls the expansion of said bushing. According to another particularly advantageous characteristic, the end of the rod that is not provided with the head is associated with a control lever of which the movement provides the displacement in translation of the rod. More precisely, the passing from a rest configuration to an expanded configuration is controlled by the rotation of a control lever/cam which, in the passing from a raised position to a lowered position, provides the movement of an expansion rod of which the head moves inside said bushing, said lever also providing a rest against said plate.

As such, the rotation of the lever provides the displacement in translation of the rod. To do this, said lever is preformed with a profile which in its rotation comes to rest against said plate. In addition, according to another characteristic, the high end of the bushing comprises a head offering a surface for resting against the plate and whereon the profile of the lever comes to rest.

According to another particularly advantageous characteristic, a means of compressing is located between the high end of the bushing and the support surface of the lever and is deformed under the action of the latter in lowered position.

The fundamental concepts of the invention having just been exposed hereinabove in their most elementary form, other details and characteristics will appear more clearly when reading the following description and with regard to the annexed drawings, providing by way of a non-limiting example, an embodiment of a device in accordance with the invention.

BRIEF DESCRIPTION OF THE DRAWINGS

FIG. 7 is a schematic drawing of a cross-section of a feature of another embodiment.

DESCRIPTION OF PREFERRED EMBODIMENTS

Figure 1:
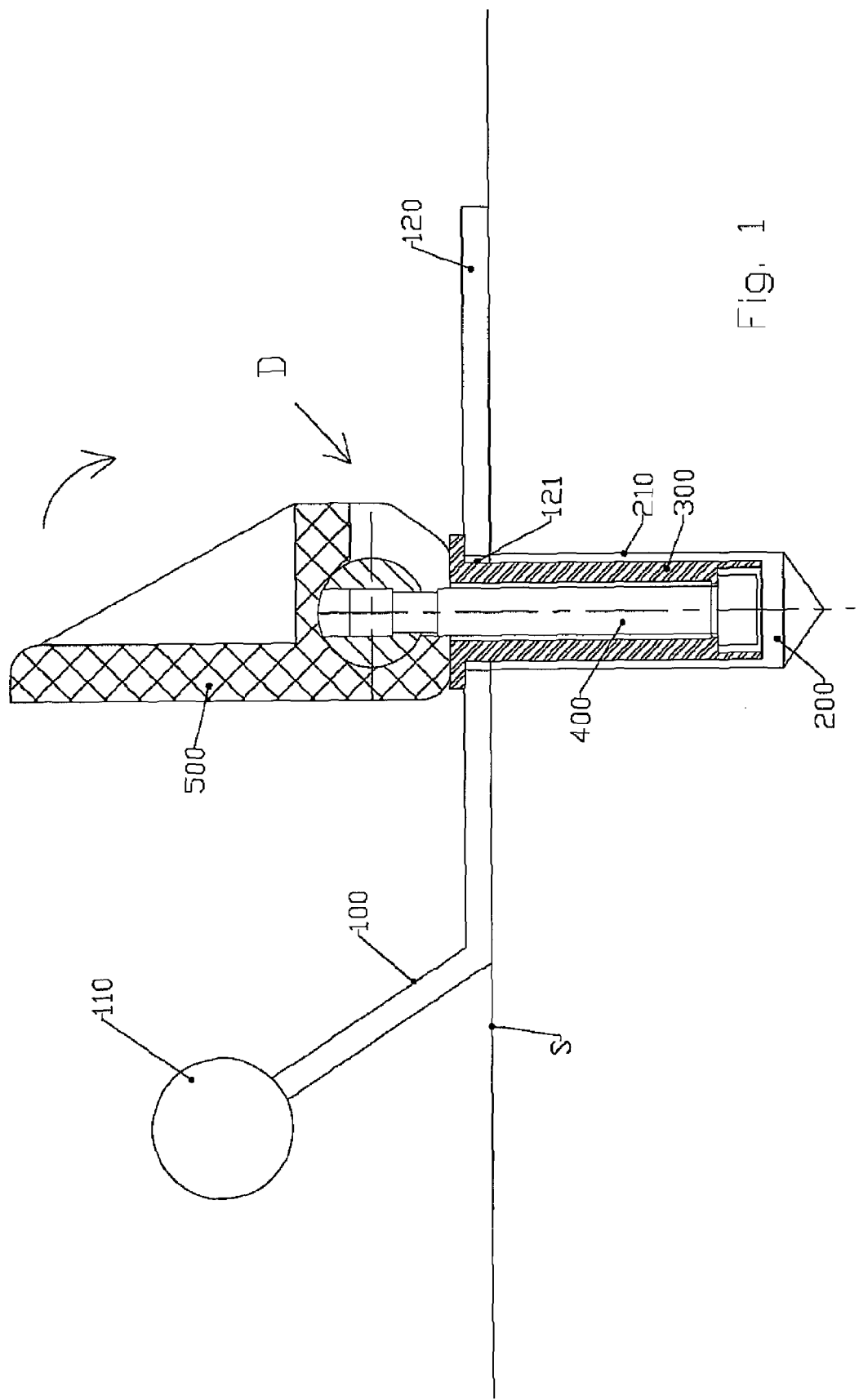
FIG. 1 is a schematic drawing of a cross-section of an embodiment of the device of the invention in raised position in use.
Figure 2:
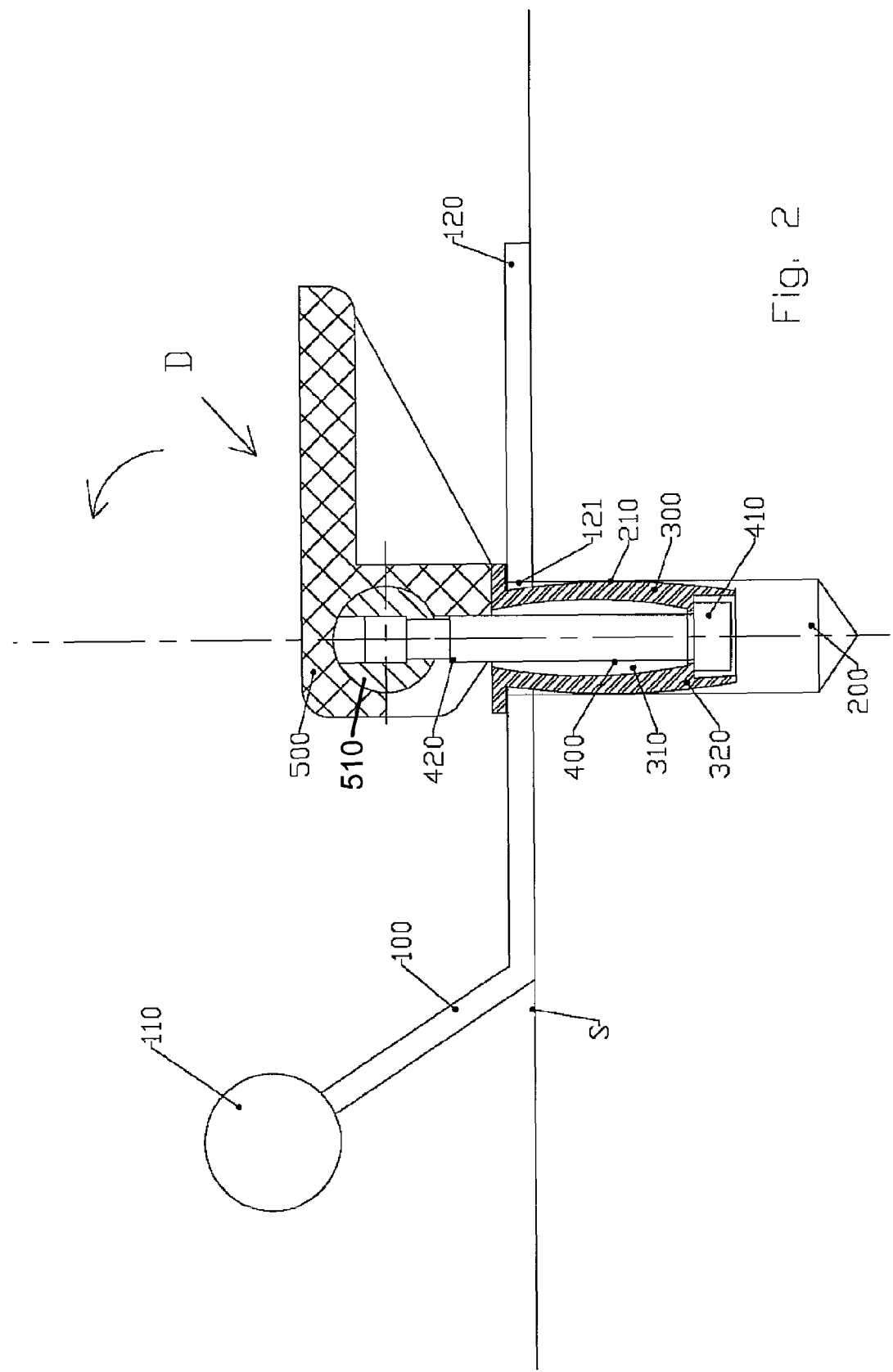
FIG. 2 shows the expanded position of the device in FIG. 1.

Such as is shown in the drawing in FIGS. 1 and 2, the device for locking/unlocking referenced as D as a whole provides the positioning and the maintaining in position of a connecting plate 100 to the ground S or to the rim of a basin of a roof element not shown.

The plate 100 is on the one hand connected to the rim of the roof element not shown on its end 110 and on the other hand connected to the ground S or to the rim of the basin via its plane portion 120. This plate 100 is also pierced by an orifice 121 coming to face a hole 200 made in the ground S, The device D, by crossing the plate through the orifice 121, interacts with the hole 200 made in the ground S and rests against the plate 100 for the purposes of attaching the latter.

To do this and in accordance with the design of the invention, the device D comprises an expandable bushing 300 passing from a volume called a rest volume authorising its introduction into the hole 200 made in the ground S (cf. FIG. 1) to a volume called the expanded volume providing its adhesion to the cylindrical walls 210 of said hole 200 (cf. FIG. 2).

According to the embodiment shown, the bushing 300 is made of elastic material accepting a deformation of which the implementation is described hereinafter. The expandable bushing 300 is hollow and receives in its hollow core 310, an expansion rod 400 of which a first end 410 is connected to the low end 320 of the bushing 300 and of which the second end 420 exiting outside of the bushing and is connected to a module for moving and locking providing the displacement in translation of said rod 400 which, due to its connection with the bushing, provides its deformation or its return to the initial position. The deformation provides a radial expansion of the bushing of which the exterior walls are going to exert a pressure on the interior walls 210 of the hole 200 made in the ground S. The pressure exerted makes it possible to attach to the ground the device D and therefore the plate 100 whereon it rests.

A bushing made of plastic material tends furthermore, through its elasticity, to return to a normal position of rest which facilitates the unlocking movement. The device comprises a lever/cam 500 passing from a raised position (cf. FIG. 1) wherein the bushing 300 is in a position of rest to a lowered position (cf. FIG. 2) wherein the bushing 300 is in an expanded position. As such, the displacement in translation of the rod 400 is implemented by a lever/cam 500 which, via a rotation according to 90° and a resting against the head of the bushing 300, increases the distance between its connection point with the end 420 of the rod 400 and the surface of the ground. For this, the lever 500 is provided with a ball connection 510 which receives and retains the end 420 of the rod and around which pivots according to a horizontal axis said lever 500. This lever 500 having a thickness that is greater in horizontal position than in vertical position, the ball 510 and consequently the end 420 moves away from the resting surface between the lever 500 and the head of the bushing 300.

Although not shown, such an embodiment of the device can authorise the attaching in the threaded inserts occupying the hole 200 because the plastic surface of the bushing can partially be introduced into the threading and propose the sought attaching.

In order to better interact with the threaded inserts that exist or that are to be installed, the applicant has provided other embodiments which are described hereinafter.

As shown in the drawing in FIGS. 3, 4, 5 and 6, the bushing i.e. the portion expanding inside the threaded insert is comprised of a cylindrical tube 300a of which the exterior surface is, at least at the low end, threaded, of the same pitch and of the same depth as the threading 222 presented by the insert 220 (FIG. 7). In order to present a diameter that is less than that of the insert, the threaded tube is advantageously arranged with notches 310a exiting onto the low end which decreases the diameter of it and increases the elasticity of this threaded portion which will make it possible for it to pass from a rest position (cf. FIG. 3) of a diameter allowing for the sliding of the bushing 300a in the threaded insert to an expanded position (cf. FIG. 4) where the diameter of the bushing 300a corresponds to a threaded rod interacting with the threading 222 of the insert 220 (FIG. 7).

This bushing 300a is preferentially of metal and according to a preferred embodiment, it is made of brass. In order to provide a progressive expansion, the expansion rod 400a enters the hollow core of the bushing 300a in order to provide it with the desired diameter. As such, in this embodiment, the expandable bushing 300a is threaded onto a rod 400a equipped with a head 410a of which the displacement in translation provides the expansion or the decrease of the bushing 300a.

In order to optimise the expansion, the head 410a of the rod 400a has a rounded tapered profile and penetrates partially into the hollow core of the bushing 300a.

The displacement of the rod 300a is implemented in the same manner as in the first embodiment by rotation of a cam lever 500a. Nevertheless and in order to overcome the lack of elasticity of the bushing 300a and to better maintain the pressure exerted, a compression buffer 600a is located between the top of the bushing 300a and the bottom of the lever 500a. This buffer 600a manufactured from an elastic material provides, once compressed between the lever 500a and the plate 100, the maintaining of a tension installed in expanded position and therefore in locked position.

Figure 5:
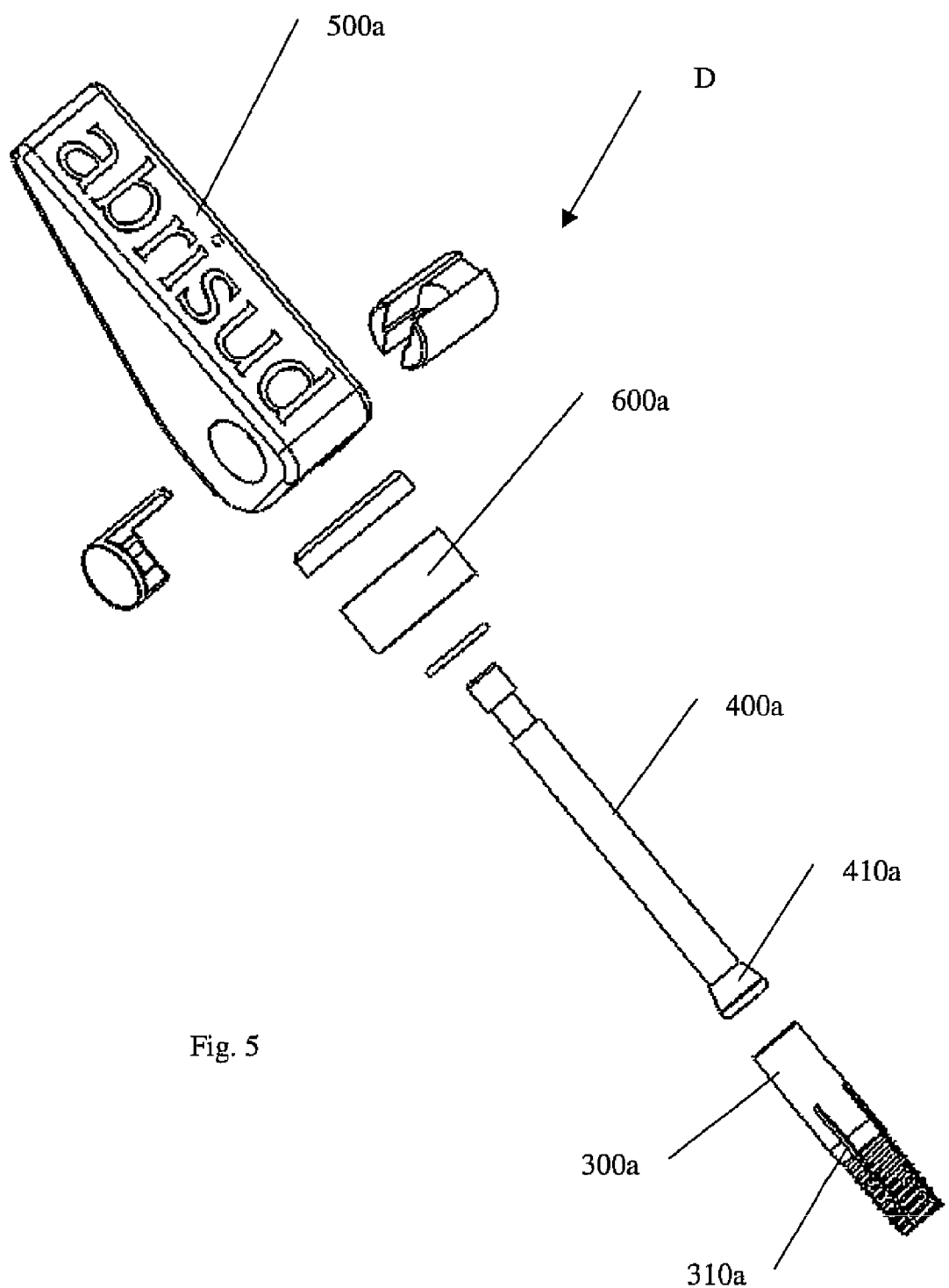
FIG. 5 is a schematic drawing of an exploded perspective view of the embodiment in FIGS. 3 and 4.

This embodiment is shown in the drawing in an exploded perspective in FIG. 5.

Figure 3:
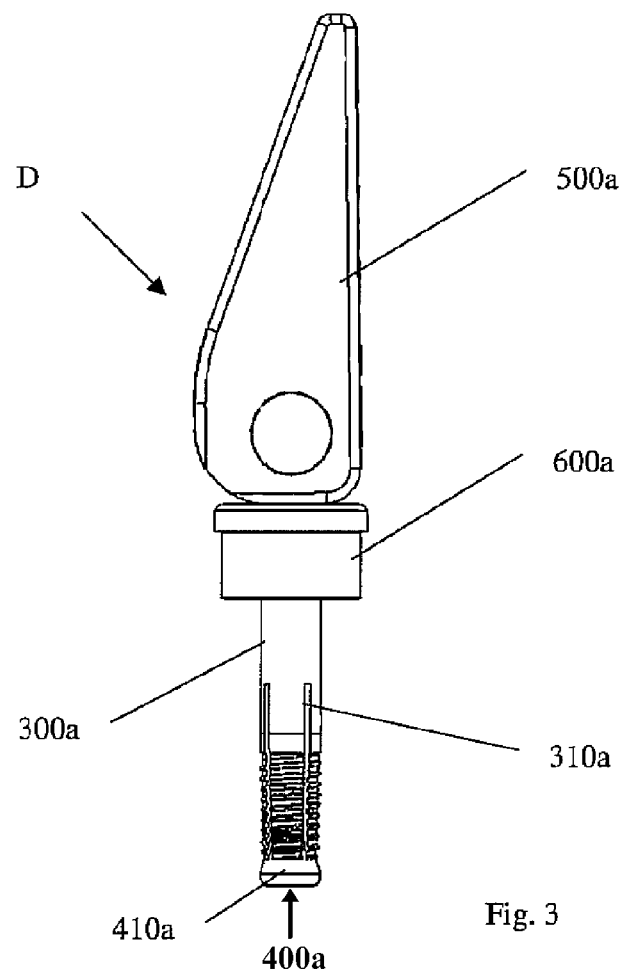
FIG. 3 shows another embodiment of the device of the invention in rest position.
Figure 4:
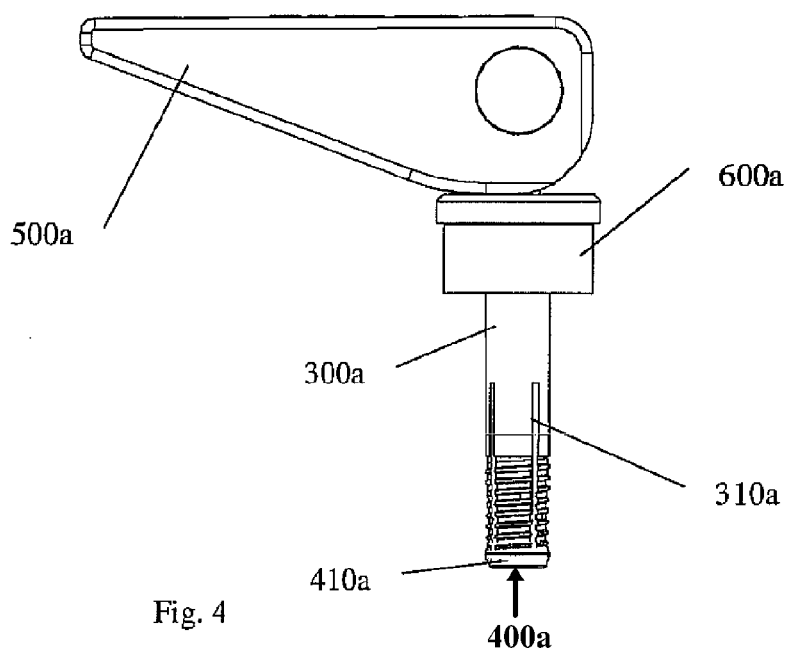
FIG. 4 shows the device in FIG. 3 in expanded position.
Figure 6:
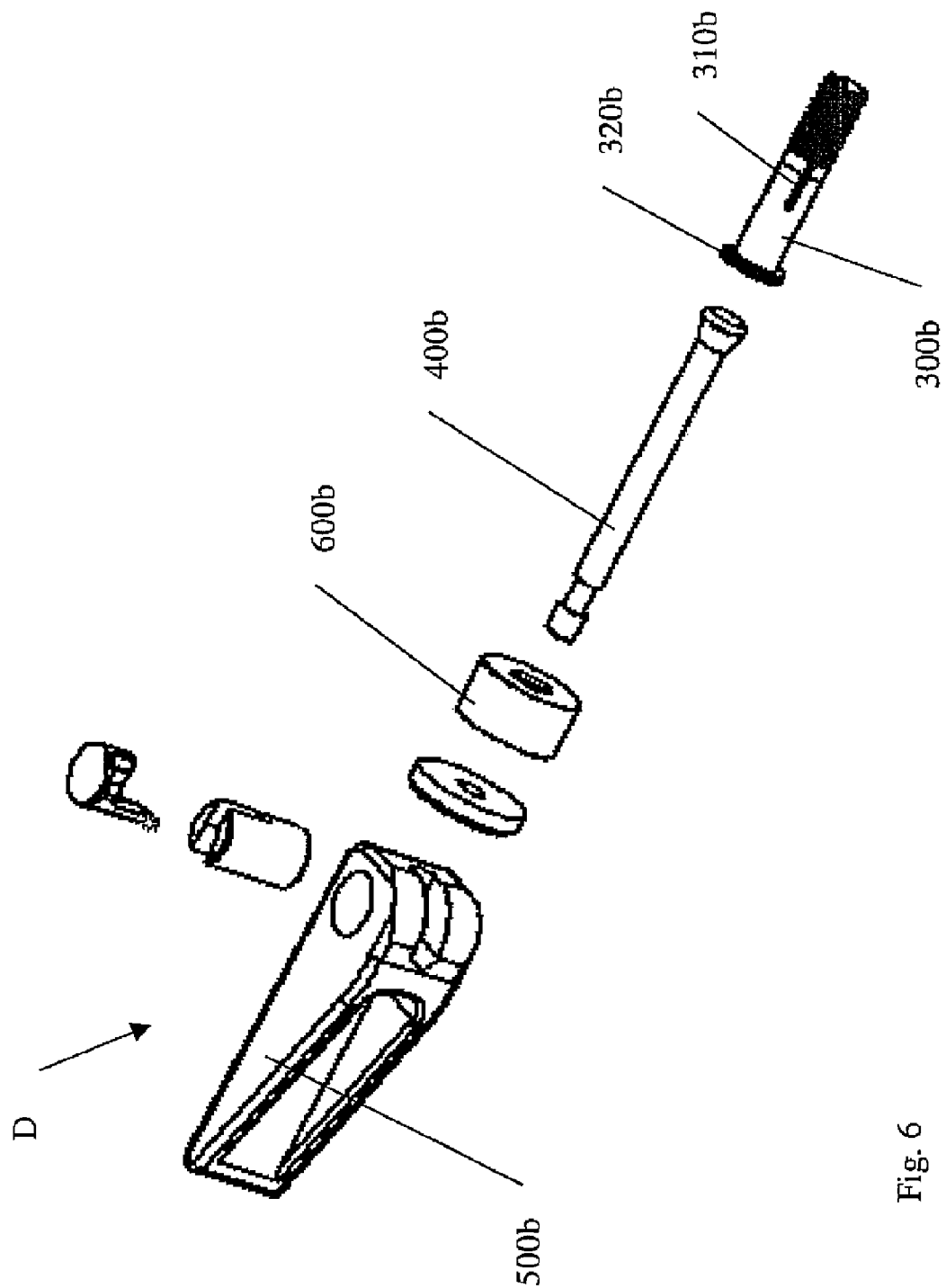
FIG. 6 is a schematic drawing of an exploded perspective view of another embodiment.

The drawing in FIG. 6 shows another embodiment of the device D which differs from that shown in FIGS. 3 to 5 in that the bushing 300b preformed with notches 310b comprises a head 320b with which is going to become integral the compression buffer 600b. As such, this embodiment proposes a connection between the various elements threaded onto the expansion rod 400b.

It is understood that the device, which has just been described and shown hereinabove, was described and shown for the purposes of a divulgation rather than a limitation. Of course, various arrangements, modifications and improvements can be made to the example hereinabove, without however leaving the scope of the invention.

The invention claimed is:

1. A device for locking/unlocking of a connecting plate to the ground or to a rim of a basin,
    the connecting plate being configured to be connected to a rim of a roof element,
    the plate being pierced by an orifice coming to face a hole made in the ground or the rim of the basin,
    the device for locking/unlocking interacting with the hole made in the ground or the rim of the basin and rests against the plate for the purposes of attaching the latter,
    CHARACTERISED IN THAT the device comprises an expandable bushing passing from a volume called a rest volume enabling its introduction into the hole to a volume called the expanded volume providing its adhesion to the walls of said hole,
wherein the hole is provided with a threaded insert, CHARACTERISED BY THE FACT THAT the expandable bushing is comprised by a threaded cylinder according to the pitch and the depth defined by the insert and split in order to pass from a rest position of a diameter allowing for the sliding of the bushing in the threaded insert to an expanded position wherein the diameter corresponds to and interacts with the insert.

2. A device according to claim 1, CHARACTERISED BY THE FACT THAT the expandable bushing is hollow and is inserted onto a rod provided with a head interacting with the lower end of the expandable bushing and of which the displacement in translation provides the expansion or the decrease of the bushing.

3. A device according to claim 1, CHARACTERISED BY THE FACT THAT it comprises a lever/cam passing from a raised position wherein the bushing (300) is in a position of rest to a lowered position wherein the bushing (300) is in an expanded position.

4. A device according to claim 3, CHARACTERISED BY THE FACT THAT the rotation of the lever provides for the displacement in translation of a rod.

5. A device according to claim 3, CHARACTERISED BY THE FACT THAT said lever is preformed with a profile which in its rotation comes to rest against said plate.

6. A device according to claim 5, CHARACTERISED BY THE FACT THAT the high end of the bushing comprises a head offering a resting surface against the plate.

7. A device according to claim 3, CHARACTERISED BY THE FACT THAT a means of compressing is located between the high end of the bushing and the resting surface of the lever and is deformed under the action of the latter in lowered position.

* * * * *